(12) United States Patent
Khay-Ibbat

(10) Patent No.: US 9,008,023 B2
(45) Date of Patent: Apr. 14, 2015

(54) FAST TRANSITION FROM PCH TO DCH FOR UMTS

(71) Applicant: Samy Khay-Ibbat, Cupertino, CA (US)

(72) Inventor: Samy Khay-Ibbat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 13/746,494

(22) Filed: Jan. 22, 2013

(65) Prior Publication Data

US 2014/0204845 A1 Jul. 24, 2014

(51) Int. Cl.
*H04W 72/04* (2009.01)
*H04W 68/00* (2009.01)
*H04W 76/04* (2009.01)

(52) U.S. Cl.
CPC ............ *H04W 68/00* (2013.01); *H04W 76/046* (2013.01)

(58) Field of Classification Search
CPC ... H04W 72/0406; H04W 76/02; H04L 5/003
USPC .......................... 370/329, 431, 468, 230, 235
See application file for complete search history.

(56) References Cited

U.S. PATENT DOCUMENTS

| 8,320,929 | B2 | 11/2012 | Torsner et al. | |
| 2008/0182594 | A1 | 7/2008 | Flore et al. | |
| 2011/0111765 | A1 | 5/2011 | Yang et al. | |
| 2011/0194436 | A1 | 8/2011 | Song et al. | |
| 2013/0182586 | A1* | 7/2013 | Paladugu et al. | 370/252 |
| 2013/0182685 | A1* | 7/2013 | Yu et al. | 370/336 |
| 2013/0189980 | A1* | 7/2013 | Ekici et al. | 455/435.1 |
| 2013/0189992 | A1* | 7/2013 | Farnsworth et al. | 455/437 |
| 2014/0051415 | A1* | 2/2014 | Ekici et al. | 455/418 |
| 2014/0051454 | A1* | 2/2014 | Wirtanen et al. | 455/452.1 |
| 2014/0078892 | A1* | 3/2014 | Cave et al. | 370/228 |
| 2014/0119195 | A1* | 5/2014 | Tofighbakhsh et al. | 370/241 |
| 2014/0199979 | A1* | 7/2014 | Singhai et al. | 455/418 |

FOREIGN PATENT DOCUMENTS

WO 2013016802 A1 2/2013

\* cited by examiner

*Primary Examiner* — Brian D Nguyen

(74) *Attorney, Agent, or Firm* — Kenyon & Kenyon LLP

(57) ABSTRACT

Systems and methods for logically transitioning a client device or user equipment (UE) directly to a DCH state for the data path when an application layer application initiates an operation that may result in the transmission of large amounts of data, are presented. Upon detection of a condition that would warrant allocation of a dedicated channel, the UE may set the Traffic Volume Indicator in a subsequent cell update message to the network node. The node may then assign a dedicated channel and the UE may be transitioned to the dedicated channel state without a portion of the application data being first transmitted on a forward access channel or random access channel in a CELL_FACH state.

21 Claims, 5 Drawing Sheets

200

FAST TRANSITION FROM PCH TO DCH FOR UMTS

BACKGROUND

Aspects of the present invention relate generally to the field of cellular communications, and more specifically to improving the user equipment transition from a PCH state to a DCH state for the anticipated transmission of large amounts of data on UMTS.

Generally, for terminals, client devices or user equipment (UE) communicating in accordance with the Universal Mobile Telecommunications System (UMTS) standard, the UE connected to the cellular telecommunications network will conventionally have four potential non-idle states once a Radio Resource Control (RRC) connection has been established: CELL_DCH, CELL_FACH, CELL_PCH, and URA_PCH. In the CELL_DCH state, dedicated channels for uplink and downlink to the UE are allocated for the transmission/reception of data. The CELL_DCH state is suitable for the transmission of large amounts of data. In the CELL_FACH state, no physical channel is dedicated to the UE, but a forward access channel (FACH) is continuously monitored by the UE for downlink and a default common or shared transport channel is assigned for uplink transmissions. The CELL_FACH state is suitable for the transmission of small amounts of data. In the CELL_PCH state, no physical channel is dedicated to the UE and no uplink activity is possible. However, in CELL_PCH, a paging channel (PCH) is monitored by the UE for downlink. Similarly, in the URA_PCH state, no physical channel is dedicated to the UE, no uplink activity is possible, and a paging channel is monitored by the UE for downlink notifications. Both the CELL_PCH and URA_PCH states are suitable for the UE to save battery when no data is actively being exchanged.

Conventionally, a UE in idle state transitions to a connected CELL_FACH or CELL_DCH state when a network connection is established. Then additional state transitions are based on the activity and the amount of data in the buffer for transmission. For example, when in CELL_DCH state, if the delay in transmission activity exceeds a predetermined threshold, then the UE may be transitioned to the CELL_FACH state. When in the CELL_FACH state, if the activity level drops below a predetermined threshold, the UE may be transitioned to CELL_PCH or URA_PCH state.

The UE may be transitioned from CELL_PCH to CELL_FACH and from URA_PCH to CELL_FACH upon detection of activity requiring a forward access channel or an uplink channel. When in CELL_FACH, if the amount of data awaiting transmission on the channel exceeds a predetermined threshold, the UE may be transitioned to CELL_DCH state. The network system will assign a dedicated channel to the UE for transmission of the data. For example, in the case of an uplink FTP transfer, with a UE in the CELL_PCH state, the UE will initially transition to CELL_FACH to manage the TCP handshake and initiate the FTP session. Then, once the data transmission has begun, the data waiting to be transmitted may be measured, a dedicated channel may be allocated, and the UE will be transitioned from the CELL_FACH to the CELL_DCH state.

From the CELL_PCH or URA_PCH state, the UE may transmit a cell update message with the Traffic Volume Indicator (TVI) flag set. Conventionally, the TVI information element in a cell update message indicates that the UE has more data in its MAC buffer than a predetermined threshold. The predetermined threshold is typically configurable by the network in order to manage efficient allocation of channel resources. This would conventionally trigger the network to switch the UE to CELL_DCH directly.

Therefore, in order to transmit information on the network, when the TVI flag is not set, the UE is first transitioned from the URA_PCH or CELL_PCH state to the CELL_FACH state and then from the CELL_FACH state to the CELL_DCH state. However, if the data to be transmitted is known by UE prior to initiating the transmission, or when the UE otherwise detects that a dedicated channel will be required for a transmission, the transition from a PCH state to the CELL_FACH state and then to the CELL_DCH state causes unnecessary delay. Additionally, with each state switch, there are additional opportunities for network and transmission errors. Accordingly, there is a need in the art to expedite the UE switch to a DCH state for the anticipated transmission of large amount of data over the cellular network.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Systems and methods for transitioning a client device or user equipment (UE) directly to a DCH state when an application layer application initiates an operation that may result in the transmission of a large amount of data are presented. The direct transition may allow for fewer state transitions of the UE as a FACH state may be completely avoided. Additionally, with a single transition to a DCH state, the UE may exchange fewer signaling messages with the network, thereby preserving network bandwidth. The direct transition may also result in a faster application response time as the UE begins transmitting data sooner, without the additional state transitions and messaging.

Figure 1:
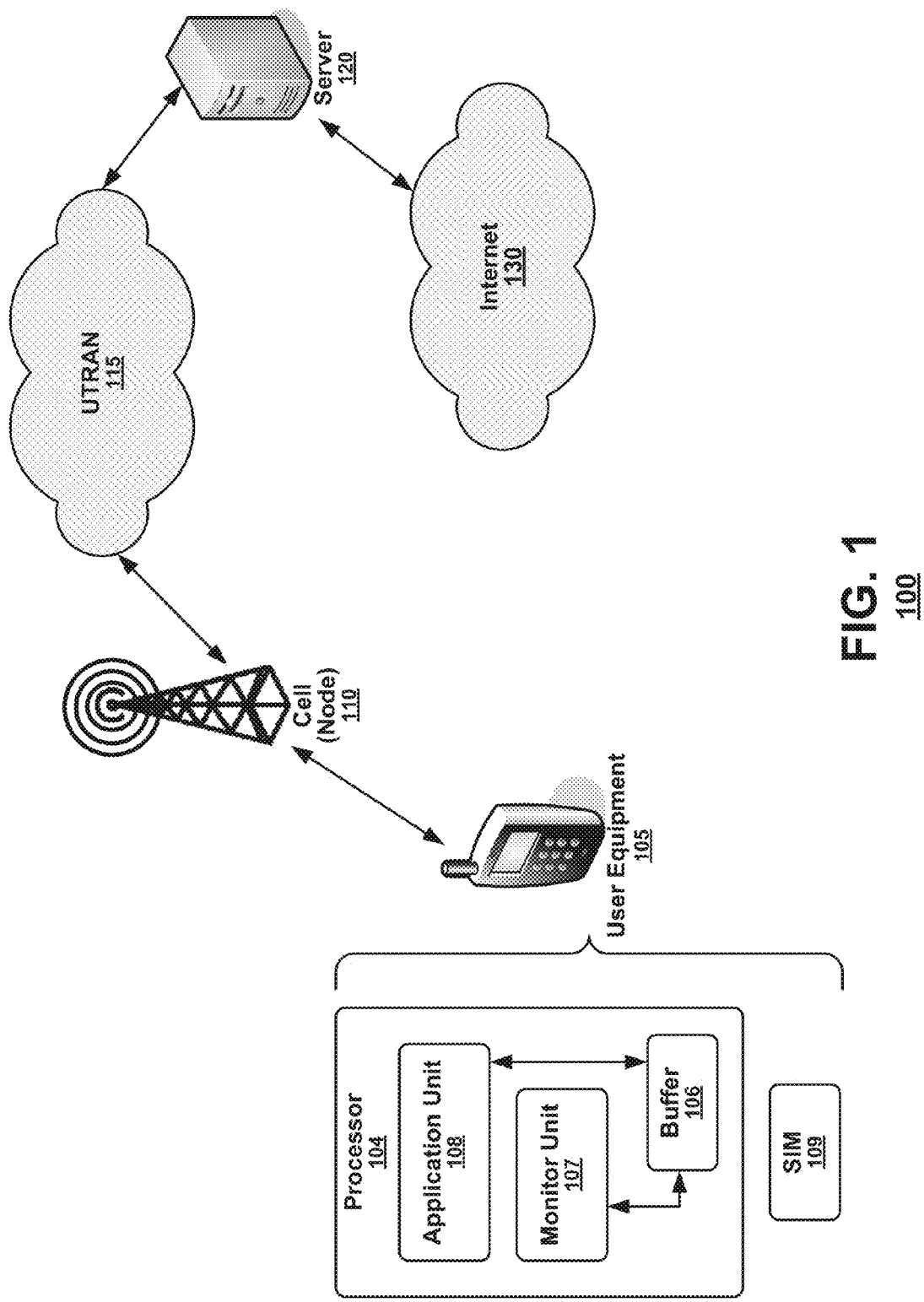
FIG. 1 is a simplified block diagram of an exemplary communications system according to an embodiment of the present invention.

FIG. 1 is a simplified block diagram of an exemplary communications system 100 according to an embodiment of the present invention. The user equipment (UE) 105 may be any device that allows a user to access the network services described herein and may be used directly by an end-user to communicate with the network, including a hand-held phone, a laptop computer or tablet computer equipped with a mobile adapter, or any other network communication device or transceiver. The user equipment may additionally include at least a SIM 109 and a processor 104 to manage mobility management, call control, session management, and identity management tasks. As shown in FIG. 1, the UE 105 processor 104 may execute an application 108 on the UE 105. The application 108 may access a memory unit or buffer 106 for transmitting data on the network. The UE may additionally include a monitoring unit 107 that monitors the capacity of the buffer 106 and determines when a dedicated channel is needed to efficiently complete the transmission.

According to an embodiment, the system 100 may include a UE 105 that connects to the Universal Terrestrial Radio Access Network (UTRAN) 115 via a network node or cell 110. The network 115 is specified by UMTS and may be composed of multiple base stations using different terrestrial air interface standards and frequency bands. As shown in FIG. 1, the UE 105 may be connected via the UTRAN 115 to other networks including, for example the Internet 130 or other circuit switched network, a packet switched network (not shown), or other communication network via one or more servers 120.

Then the UE 105 may operate in accordance with the UMTS standard. For example if an application of the UE 105 requests a signaling connection, an RRC connection may be initiated in an idle UE 105 via an RRC Connection Request message from the UE 105 to the UTRAN 115. Then a communication channel may be assigned and the UE 105 may enter a connected state in accordance with the UE configuration, the connection request, and/or the connection response.

Upon initiation of an application that will involve the transmission of data to or from the UE 105, a dedicated channel may be assigned for the transmission. The UE 105 may then be transitioned to the CELL_DCH state from a PCH state for the data transmission. To signal that a dedicated channel should be assigned to the UE 105, a cell update with the TVI flag set to indicate that although the current application has not yet required a large amount of information, the application may require a sufficiently large amount of data in the near future to allocate a dedicated channel to the associated UE 105. According to an embodiment, the predetermined threshold may be set by the application, as a default or adjustable variable at the UE 105, or by the network.

Figure 2:
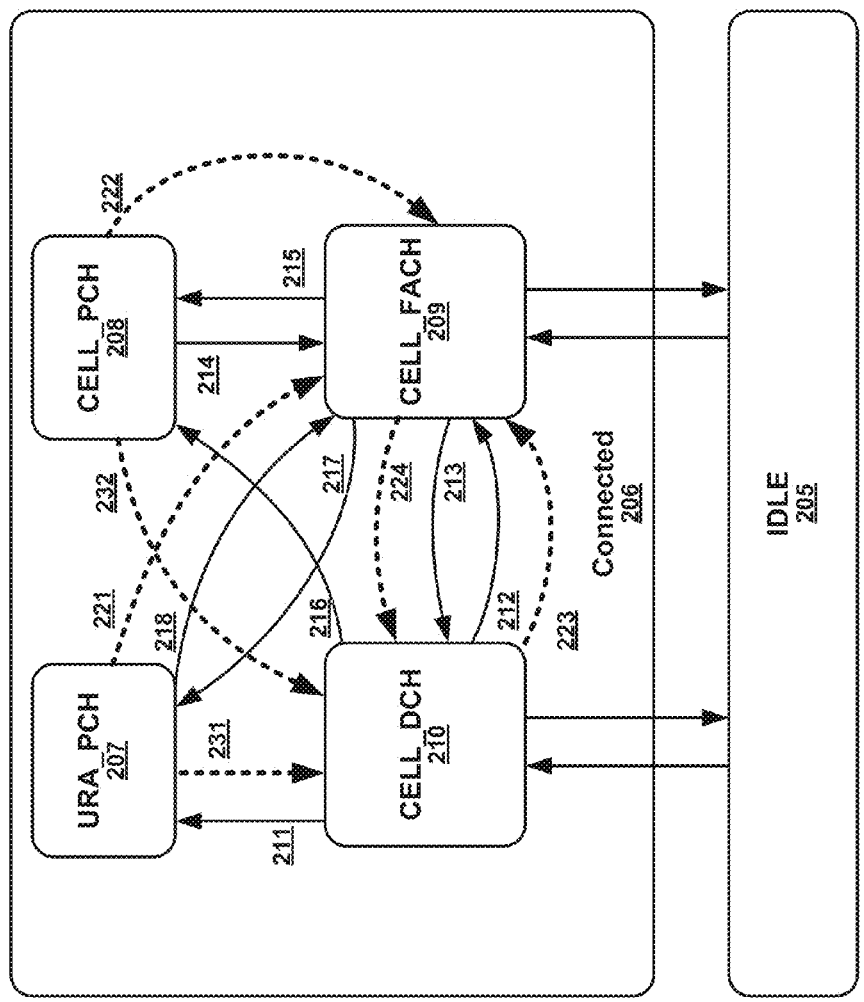
FIG. 2 is a simplified state diagram for exemplary user equipment according to an embodiment of the present invention.

FIG. 2 is a simplified state diagram 200 for exemplary user equipment (UE) according to an embodiment of the present invention. As shown in FIG. 2, the UE may have an idle state 205 and a connected state 206. In the connected state 206, the UE may transition between a URA_PCH state 207, a CELL_PCH state 208, a CELL_FACH state 209, and a CELL_DCH state 210.

According to an embodiment, as shown at transitions 214 and 218, for the signaling path, the UE may transition from the URA_PCH state 207 or a CELL_PCH state 208 to a CELL_FACH state 209 when an uplink or downlink channel is required to transmit a relatively small amount of data between the UE and the network or a cell update message. This may include a connection initiation via a handshake process, or other exchange of information. An exemplary transmission involving a relatively small packet may include DNS resolution for connecting to a server and a subsequent handshake to initiate a connection session, for example, when initiating an FTP uplink.

Then the UE may transition from the CELL_FACH state 209 to the CELL_DCH state 210 as shown at transition 213 when the amount of data waiting to be exchanged between the UE and the network exceeds a predetermined threshold. For example, once an FTP uplink of a relatively large file is initiated, the amount of data waiting to be transmitted in the MAC buffer or transport layer may exceed the threshold. Then, from the CELL_FACH state 209, the UE will transmit a measurement report message to the network, for example, an RRC event 4a, indicating that a dedicated channel should be assigned to the UE to efficiently complete the transmission.

During these transitions, the data path may similarly transition between similar logical states. For example, as shown in FIG. 2, when data is awaiting transmittal to or from the UE, this may trigger the UE to transition from a URA_PCH state 207 to a CELL_FACH state 209 (transition 221), from a CELL_PCH state 208 to a CELL_FACH state 209 (transition 222), from a CELL_FACH state 209 to a CELL_DCH state 210 (transition 224), or directly from a URA_PCH state 207 or a CELL_PCH state 208 to a CELL_DCH state (transitions 231 and 232).

The UE may additionally transition downward, as shown at transitions 214, 215, and 216, when the amount of data being transmitted between the UE and a connected network falls below a predetermined threshold, or otherwise when the activity of the UE falls below a predetermined amount. For example, if there is no activity on the dedicated channel for a predetermined amount of time, the UE may be transitioned from the CELL_DCH state 210 to the CELL_FACH state 209 (transition 212), from the CELL_DCH state 210 to the CELL_ PCH state 208 (transition 216) or the URA_PCH state 207 (transition 211), or from the CELL_FACH state 209 to the CELL_PCH state 208 (transition 215) or the URA_PCH state 207 (transition 217). The network may determine there has been no activity and transition the UE to a lower energy state when there has been no transmission on the connection for anywhere from 2 seconds to 10 seconds or another time limit set by the network. Similarly, the data path can be transitioned from a CELL_DCH state 210 to a CELL_FACH state 209 (transition 223).

Other state transitions and transition triggers may be implemented, but for ease of description, are not shown herein.

As shown at transitions 231 and 232, the logical data path of the UE may be transitioned directly to the CELL_DCH state 210 from a URA_PCH state 207 or a CELL_PCH state 208. The direct transition may be initiated when an application of the UE initiates a transmission with the network that will soon have sufficient data to require a dedicated channel. For example, with the FTP uplink example described above, the initiation of the FTP connection, including the DNS resolution and handshaking, typically requires only a small exchange of data and would therefore conventionally cause the UE to transition to the CELL_FACH state 209 for data transmission. However, the uplink of the file will quickly cause the data in the MAC buffers to exceed the predetermined threshold. Therefore, according to an embodiment of the present invention, the initiation of the transmission may trigger a direct logical change to a CELL_DCH 210 state and the assignment of a dedicated channel for data transmission.

Figure 3:
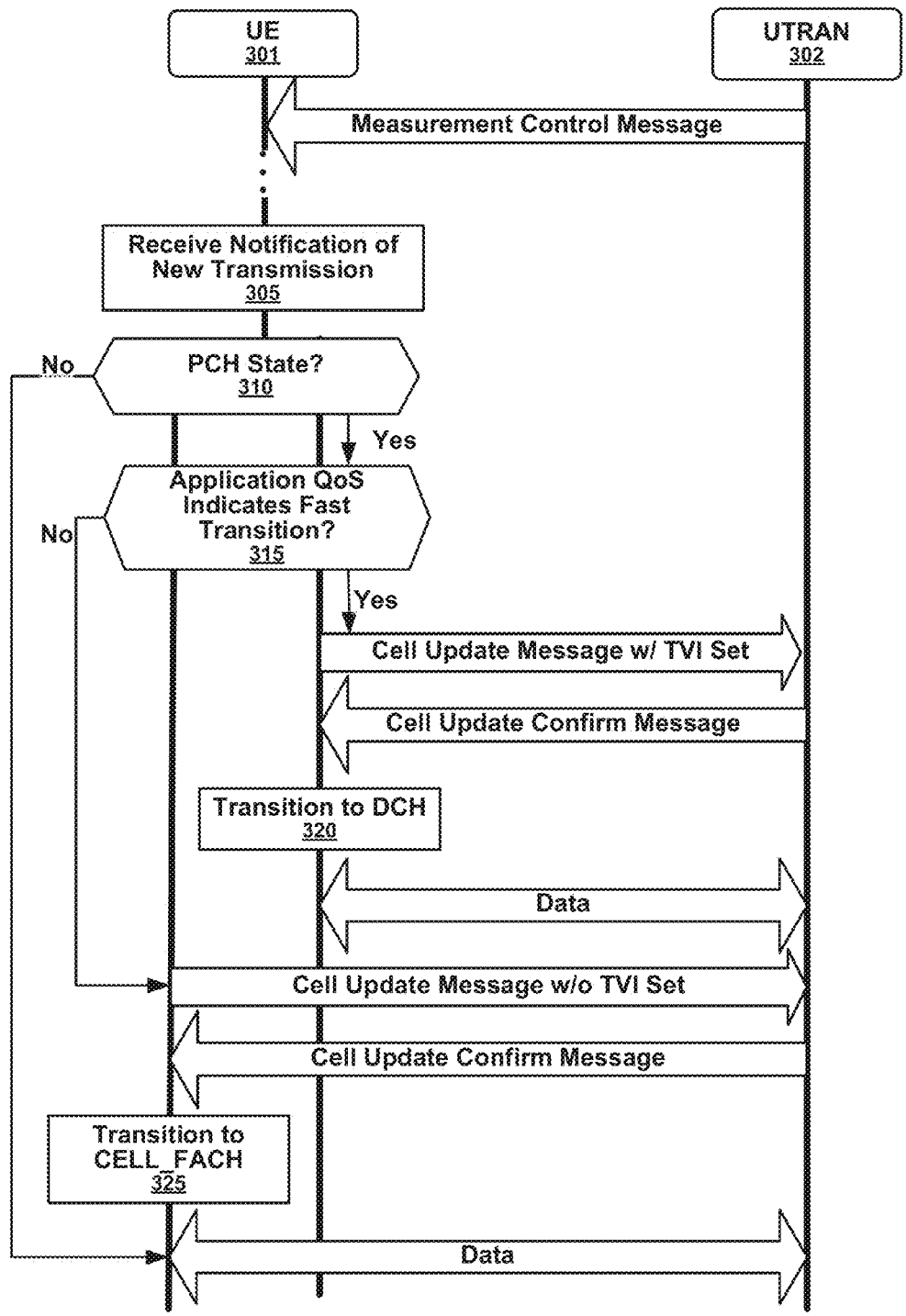
FIG. 3 illustrates an exemplary sequence of messages transmitted between user equipment and a network according to an embodiment of the present invention.

FIG. 3 illustrates an exemplary sequence of messages transmitted between user equipment (UE) 301 and the network 302 according to an embodiment of the present invention. As shown in FIG. 3, a measurement control message may be received at the UE 301. The measurement control message or similar message may set the TVI predetermined threshold, or other measurement limits for the UE 301. Although the measurement control message is shown as an initial step, according to an embodiment, the measurement control message may be received at the UE 301 at any time.

When a notification is received that a new transmission of data has been initiated (block 305), and if the UE 301 is in a PCH state (block 310), then the UE may determine whether a dedicated channel will be required for the transmission. For example, according to an embodiment, the QoS settings for the application that initiated the transmission may indicate that data should be transmitted via a dedicated channel, or the application type is such that the UE 301 may be pre-set to transmit data for that application via a dedicated channel (block 315). Such definitions may be set when the application type is anticipated to transmit significant data that would eventually require the TVI flag to be set and a dedicated channel allocated in a predetermined amount of time. For example, when the activity includes transmission of a media file on a downlink or an uplink.

Then once the UE determines that a dedicated channel is required, the UE 301 may logically enter CELL_FACH state from a signaling perspective in order to transmit a cell update message to the associated UTRAN 302 with the Traffic Volume Indicator (TVI) flag set. Upon receipt of an appropriate reconfiguration message, the UE may transition to the CELL_DCH state for data transmission (block 320). Then the data may be transmitted between the UE 301 and the UTRAN 302.

However, if the UE 301 is not in a PCH state (block 305) when a new transmission is initiated, then the UE 301 may remain in the CELL_FACH or CELL_DCH state for the transmission of data over the network. Similarly, if the UE 301 determines that a dedicated channel is not required for the transmission of data while in a PCH state in the associated application (block 315), the UE 301 may logically enter CELL_FACH state from a signaling perspective in order to transmit a cell update message to the associated UTRAN 302 without the Traffic Volume Indicator (TVI) flag set. Upon receipt of an appropriate reconfiguration message, the UE may utilize the CELL_FACH state for data transmission (block 325). Then the data may be transmitted between the UE 301 and the UTRAN 302.

Figure 4:
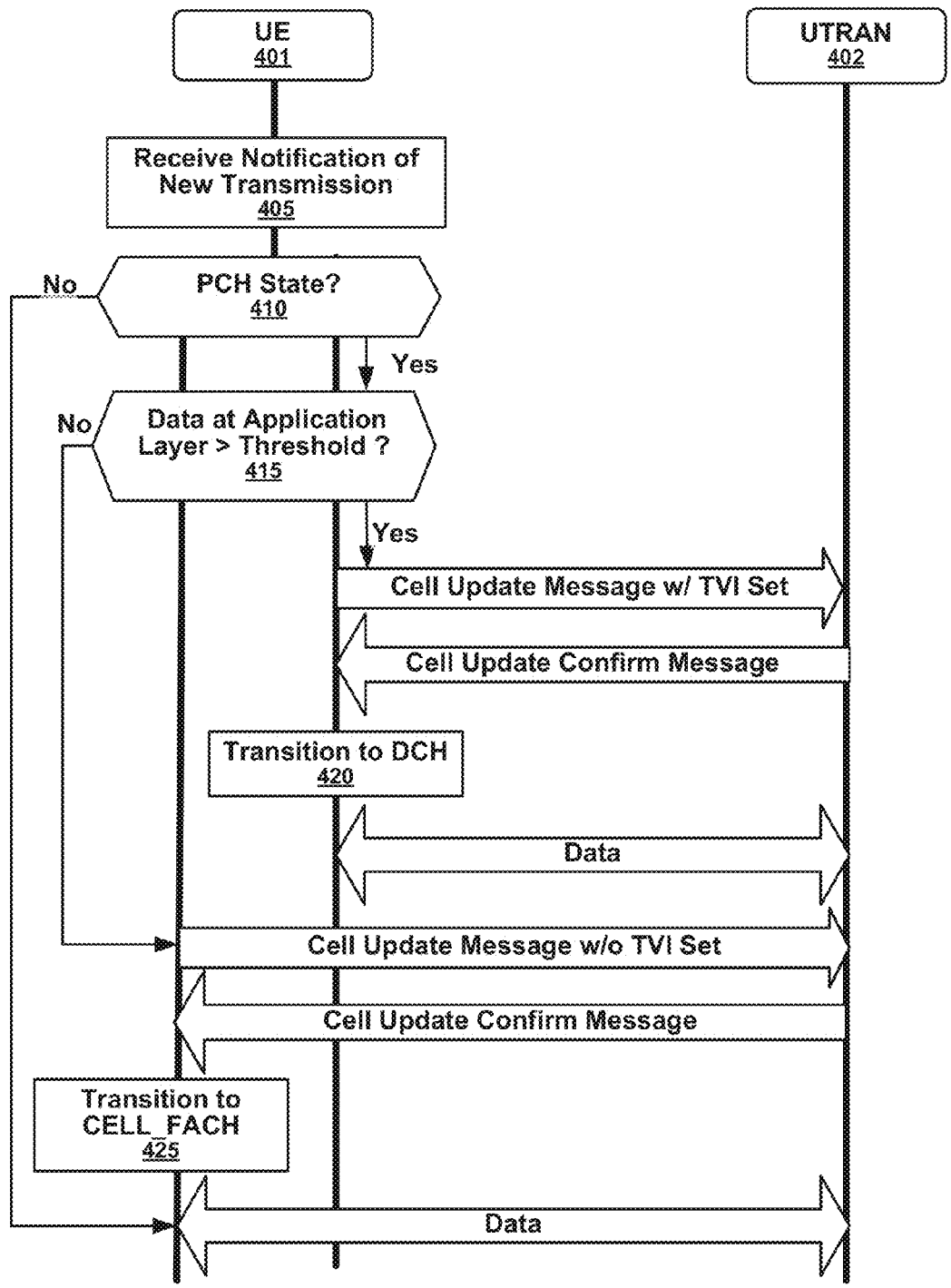
FIG. 4 illustrates an exemplary sequence of messages transmitted between user equipment and a network according to an embodiment of the present invention

FIG. 4 illustrates an exemplary sequence of messages transmitted between user equipment 401 and the network 402 according to an embodiment of the present invention. As shown in FIG. 4, when a notification is received that a new transmission of data has been initiated (block 405), and if the UE 301 is in a PCH state (block 410), then the UE may determine whether a dedicated channel will be required for the transmission. For example, when the detected activity involves an uplink from the UE 401 to the UTRAN 402, the application layer may buffer the data for a predetermined amount of time. Then if the data buffered at the application layer exceeds a predetermined threshold, for example, by exceeding the amount of data that would trigger setting the TVI flag in a cell update message, a dedicated channel may be required for transmission of the data.

Then once the UE 401 determines that a dedicated channel is required, the UE 401 may logically enter a CELL_FACH state from a signaling perspective in order to transmit a cell update message to the associated UTRAN 402 with the TVI flag set. Upon receipt of an appropriate reconfiguration message, the UE 401 may transition to the CELL_DCH state for data transmission (block 420). Then the data may be transmitted between the UE 401 and the UTRAN 402.

However, as described with reference to FIG. 3, if the UE 401 is not in a PCH state (block 405) when a new transmission is initiated, then the UE 401 may remain in the CELL_FACH or CELL_DCH state for the transmission of data over the network. Similarly, if the UE 401 determines that a dedicated channel is not required for the transmission of data while in a PCH state in the associated application (block 415), the UE 401 may logically enter a CELL_FACH state from a signaling perspective in order to transmit a cell update message to the associated UTRAN 402 without the Traffic Volume Indicator (TVI) flag set. Upon receipt of an appropriate reconfiguration message, the UE may utilize the CELL_FACH state for data transmission (block 425). Then the data may be transmitted between the UE 401 and the UTRAN 402.

Figure 5:
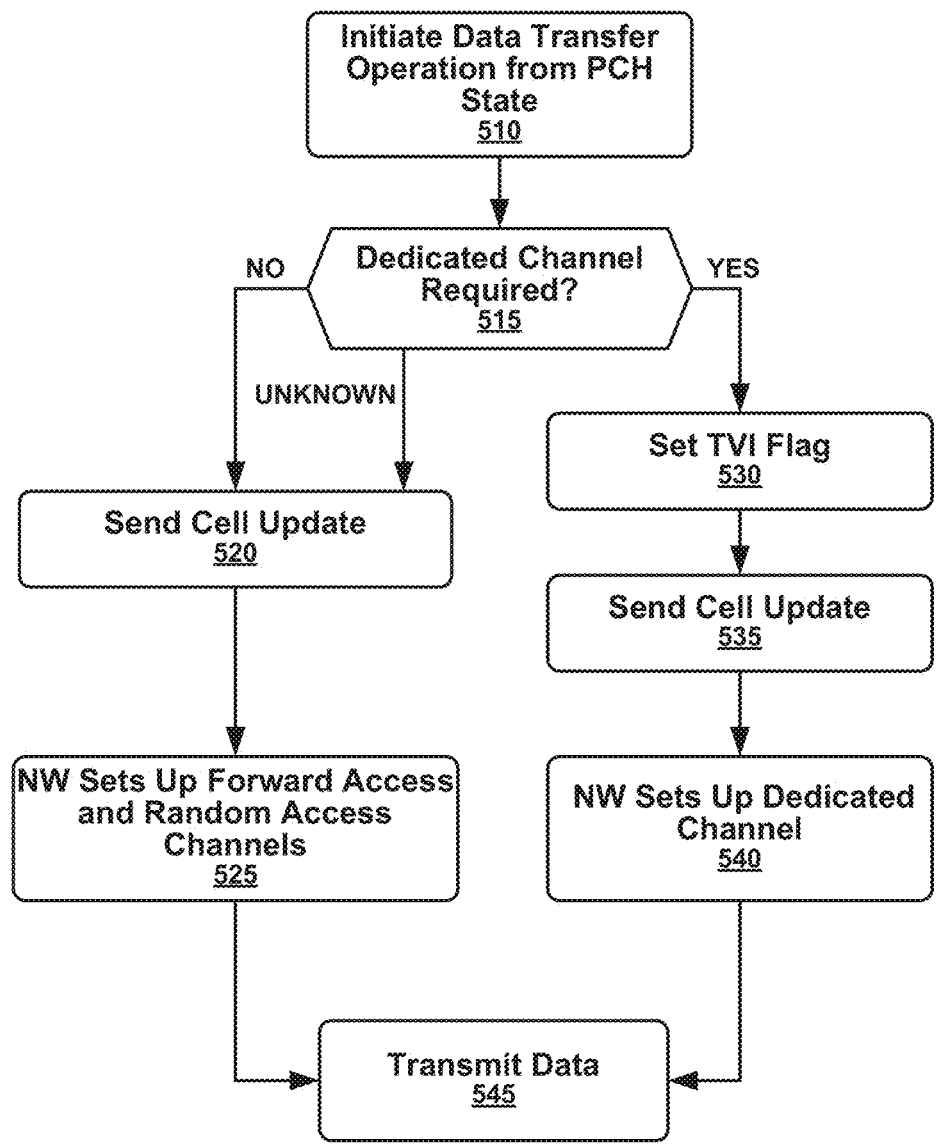
FIG. 5 is a simplified flow diagram illustrating an exemplary method for directly transitioning to a dedicated channel state according to an embodiment of the present invention.

FIG. 5 is a simplified flow diagram illustrating an exemplary method for directly transitioning to a dedicated channel for the transmission of data according to an embodiment of the present invention. As shown in FIG. 5, for a UE in a paging channel state, an application may initiate an operation that involves the transfer of data between a UE and a connected network (block 510). Then the UE may determine whether the data should be transmitted on a dedicated channel (block 515).

Data may be transmitted to and/or from the UE via a dedicated channel when the QoS definition for the application initiating the transmission indicates that a dedicated channel should be requested or when the detected activity involves an uplink from the UE to the UTRAN and the amount of data to be transmitted is greater than a predetermined threshold.

Then, if the data to be transferred to or from the UE is to be transmitted via a dedicated channel, the UE may set the TVI flag to indicate the condition (block 530) and send a call update message with the TVI flag set to the network (block 535). The UE may logically transition to CELL_FACH from a signaling perspective to transmit the cell update message. Then the UE may be transitioned to a CELL_DCH or dedicated channel state (block 540) for data transmission and the data may be transferred between the UE and the network (block 545).

As shown in FIG. 5, according to an embodiment, if the UE is in a paging channel state, and if the data to be transferred to or from the UE is not to be transmitted via a dedicated channel (block 515), the UE may logically transition to CELL_FACH or a forward access channel state from a signaling perspective and the UE may send a cell update message without setting the TVI (block 520). Then the forward access channel and random access channel may be set up as necessary to facilitate the transfer of the data between the UE and the network (block 545).

As discussed above, FIG. 1 illustrates a functional block diagram of an exemplary system according to an embodiment of the present invention. In implementation, the systems may be embodied as hardware, in which case, the illustrated blocks may correspond to circuit sub-systems within the systems. Alternatively, the components of the systems may be embodied as software, in which case, the blocks illustrated may correspond to program modules within software programs. In yet another embodiment, the systems may be hybrid systems involving both hardware circuit systems and software programs.

Moreover, not all of the functional blocks described herein need be provided or need be provided as separate units. For example, although FIG. 1 illustrates the components of an exemplary system, such as the application unit 108, monitor unit 107, and buffer 106 as separate units, in one or more embodiments, some or all of them may be integrated. Such implementation details are immaterial to the operation of the present invention unless otherwise noted above. Additionally, although FIGS. 3 through 5 illustrate exemplary sequences and methods, the order of operations may be altered or some operations skipped entirely.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method for transmitting data in a UMTS network, comprising:
   receiving at a processor on a transceiver in a paging channel state, a request to transmit data on the network;
   determining, based on an anticipated size for the data, whether the data is to be transmitted via a dedicated channel;
   if the data is to be transmitted via a dedicated channel:
      outputting on the network a message indicating a dedicated channel should be allocated for the transceiver; and
      connecting the transceiver to a network node via a dedicated channel.

2. The method of claim 1, wherein the connecting further comprises transitioning the transceiver from a first state to a dedicated channel state.

3. The method of claim 2, wherein the dedicated channel state is a CELL_DCH state.

4. The method of claim 1, wherein the paging channel state is a CELL_PCH state.

5. The method of claim 1, wherein the paging channel state is a URA_PCH state.

6. The method of claim 1, wherein the request includes an application type requesting the transmission.

7. The method of claim 6, wherein a QoS definition for the application type indicates that the data is to be transmitted via a dedicated channel.

8. The method of claim 6, wherein the application type is defined in the transceiver as an application for which the data is to be transmitted via a dedicated channel.

9. The method of claim 1, wherein the message is a cell update message.

10. The method of claim 1, wherein the message includes a traffic volume indicator (TVI) flag set to signal allocation of a dedicated channel.

11. The method of claim 1, wherein the data is to be transmitted on an uplink, an application layer buffers the data for a predetermined time limit, and if the buffered data exceeds a predetermined threshold, the data is to be transmitted via a dedicated channel.

12. The method of claim 11, wherein the predetermined threshold is set by the network.

13. A method for fast transition to a CELL_DCH state in a user equipment (UE) in a PCH state on a UMTS network, comprising:
   upon initiation of a transmission of data on a UMTS network, evaluating a Quality of Service (QoS) needed for an application transmitting the data; and
   if the QoS indicates a dedicated channel is required:
      requesting a transition to a CELL_DCH state from a first state for transmission of the application data.

14. The method of claim 13, further comprising generating a cell update message to transmit to a network node, the message including an indication that the data exceeds a predetermined threshold.

15. The method of claim 14, wherein the indication includes setting a traffic volume indicator (TVI) flag in the message.

16. The method of claim 13, wherein the first state is a paging channel state.

17. The method of claim 13, wherein the predetermined threshold is set by the network.

18. A device comprising:
   a memory for storing data for transmission on a UMTS network;
   a controller configured to receive a request to transmit data on the network when the device is in a paging channel state, determine, based on an anticipated size for the data, whether the data is to be transmitted via a dedicated channel, and if the data is to be transmitted via a dedicated channel, output on the network a message requesting a dedicated channel connection, and to connect the device to the node via a dedicated channel.

19. The device of claim 18, wherein the dedicated channel is requested by setting a traffic volume indicator (TVI) flag in the message.

20. A non-transitory computer readable medium storing program instructions that, when executed by a processing device, cause the device to:
   upon receiving at the device a request to transmit data on a UMTS network, to transmit data on the network when the device is in a paging channel state, to determine, based on an anticipated size for the data, whether the data is to be transmitted via a dedicated channel, and if the data is to be transmitted via a dedicated channel, to generate a message for transmission to a network node indicating the size of the data is greater than a predetermined threshold, and access a dedicated channel to connect the device to the node.

21. The non-transitory computer readable medium of claim 20, wherein the size of the data is indicated by setting a traffic volume indicator (TVI) flag in the message.

* * * * *